(12) United States Patent
Gumapac et al.

(10) Patent No.: US 11,531,503 B2
(45) Date of Patent: Dec. 20, 2022

(54) IMAGE PROCESSING APPARATUS AND IMAGE PROCESSING SYSTEM

(71) Applicant: KYOCERA Document Solutions Inc., Osaka (JP)

(72) Inventors: Rinel Gumapac, Osaka (JP); Kris-Antonette Torreon, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/516,475

(22) Filed: Nov. 1, 2021

(65) Prior Publication Data

US 2022/0147284 A1    May 12, 2022

(30) Foreign Application Priority Data

Nov. 9, 2020   (JP) .............................. JP2020-186507

(51) Int. Cl.
   *G06F 3/12*      (2006.01)
   *G06F 40/174*   (2020.01)
   *H04N 1/00*     (2006.01)

(52) U.S. Cl.
   CPC .......... *G06F 3/1204* (2013.01); *G06F 3/1238* (2013.01); *G06F 3/1243* (2013.01); *G06F 40/174* (2020.01); *H04N 1/00411* (2013.01)

(58) Field of Classification Search
   None
   See application file for complete search history.

(56) References Cited

U.S. PATENT DOCUMENTS

| 2015/0193417 A1* | 7/2015 | Yamamoto | G06F 40/174 |
| | | | 715/224 |
| 2020/0167413 A1* | 5/2020 | Van Rotterdam | G06F 16/95 |
| 2021/0075930 A1* | 3/2021 | Haba | H04N 1/00403 |

FOREIGN PATENT DOCUMENTS

JP    2008-131381 A    6/2008

* cited by examiner

*Primary Examiner* — Frantz Bataille
(74) *Attorney, Agent, or Firm* — Stein IP LLC

(57) ABSTRACT

An image processing apparatus has an operation panel, a reading portion, and a controller. The operation panel accepts, from a registered user, registration of an authorized user. The controller sets as a candidate a registered user who has registered a job-requesting user as an authorized user, makes the operation panel accept designation of a registered user set as a candidate, recognizes a designated registered user as a target user, and generates output data of a filled sheet filled with the target user's personal information.

6 Claims, 17 Drawing Sheets

IMAGE PROCESSING APPARATUS AND IMAGE PROCESSING SYSTEM

INCORPORATION BY REFERENCE

This application is based on and claims the benefit of priority from Japanese Patent Application No. 2020-186507 filed on Nov. 9, 2020, the contents of which are hereby incorporated by reference.

BACKGROUND

The present disclosure relates to an image processing apparatus and an image processing system.

Image processing apparatuses that read sheets are known.

A known image processing apparatus reads an image from a form sheet and stores the form image. The known image processing apparatus also stores information with which to fill the form sheet. The known image processing apparatus then merges into the form image the information with which to fill the form sheet and outputs the result.

SUMMARY

According to one aspect of the present disclosure, an image processing apparatus includes an operation panel, a reading portion, and a controller. The operation panel accepts a request for an automatic filling job. When the automatic filling job is executed, the reading portion reads a sheet with an entry field unfilled. The controller generates, from the read data obtained as a result of the reading portion reading the sheet, output data of a filled sheet with the entry field filled with registered personal information. The operation panel accepts, from a registered user who has registered personal information, registration of an authorized user whom the registered user permits to access the registered user's own personal information. When the automatic filling job is executed, the controller recognizes the job-requesting user who has requested the automatic filling job, sets as candidates the registered users who have registered the job-requesting user as an authorized user, makes the operation panel accept designation of one of the registered users set the candidates and recognizes the designated registered user as a target user, and generates the output data of the filled sheet with the entry field filled with the target user's personal information.

According to another aspect of the present disclosure, an image processing system includes an image processing apparatus as described above, a personal information server, and an authorization management server. The personal information server stores personal information. The authorization management server stores authorization information in which authorized users are associated with registered users who have registered the authorized users. The controller accesses the authorization management server to recognize the registered user who has registered the job-requesting user as an authorized user. The controller accesses the personal information server to recognize a target user's personal information.

DETAILED DESCRIPTION

One embodiment of the present disclosure will be described below, taking as an example an image forming apparatus (multifunction peripheral) provided with a plurality of functions including a copying function.

Figure 1:
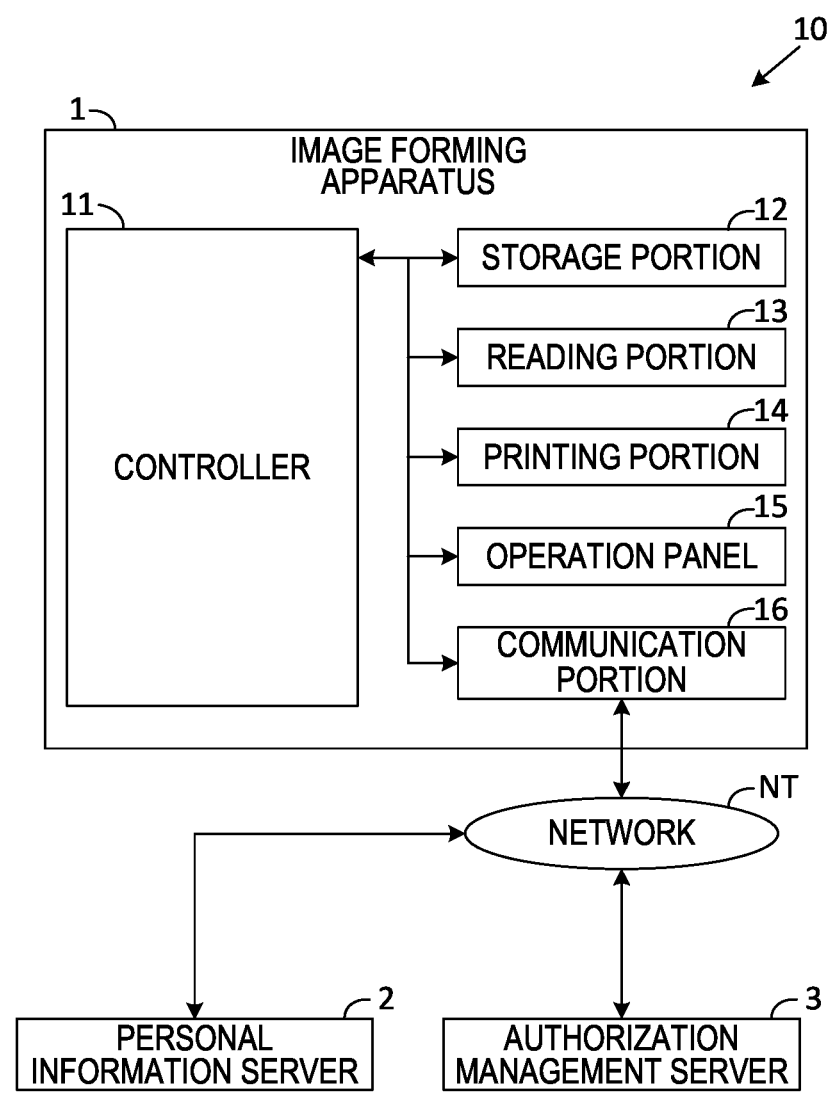
FIG. 1 is a block diagram of an image forming apparatus according to an embodiment.

Construction of an Image Forming Apparatus: As shown in FIG. 1, the image forming apparatus 1 (corresponding to an image processing apparatus) according to the embodiment includes a controller 11. The controller 11 includes processing circuits such as a CPU and an ASIC. The controller 11 controls the image forming apparatus 1. The image forming apparatus 1 also includes a storage portion 12. The storage portion 12 includes storage devices such as a ROM, a RAM, and a HDD. The storage portion 12 is connected to the controller 11. The controller 11 writes and reads information to and from the storage portion 12.

The storage portion 12 stores a character recognition program. Based on the character recognition program, the controller 11 performs OCR (optical character recognition) processing.

The controller 11 also performs natural language processing. Text data extracted through OCR processing becomes the target of natural language processing. Natural language processing includes morphological analysis, syntactic analysis, semantic analysis, context analysis, and the like. For example, natural language processing using a learning model generated through machine learning is performed.

Figure 2:
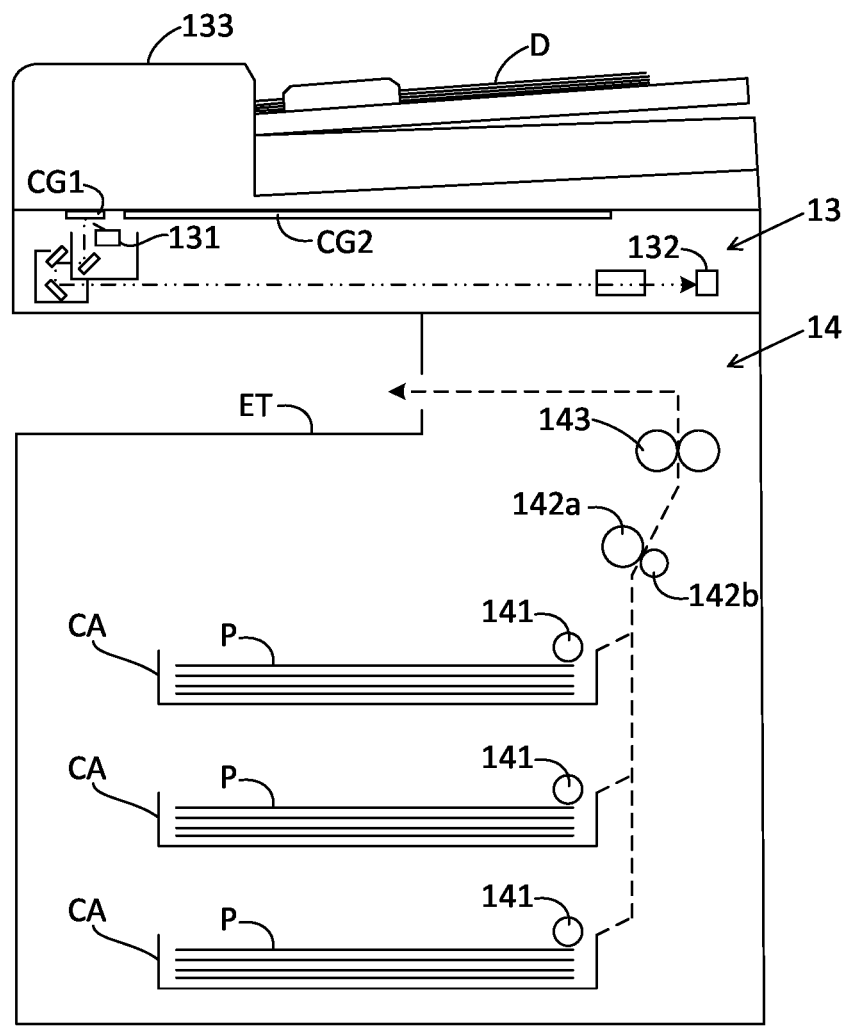
FIG. 2 is an outline diagram of the image forming apparatus according to the embodiment.

The image forming apparatus 1 includes a reading portion 13 and a printing portion 14. The controller 11 controls the reading operation by the reading portion 13. The controller 11 controls the printing operation by the printing portion 14. FIG. 2 is an outline diagram of the reading portion 13 and the printing portion 14.

The reading portion 13 optically reads a reading target D. In an automatic filling job, which will be described later, a sheet S (see the upper diagram in FIG. 3) becomes the reading target. The reading portion 13 includes a light source 131 and an image sensor 132. The light source 131 irradiates the reading target D with light (indicated by a dash-dot-dot line). The image sensor 132 receives the light (indicated by a dash-dot-dot line) reflected from the reading target D and subjects it to photoelectric conversion. The light source 131 and the image sensor 132 are disposed inside the housing of the reading portion 13.

On the top surface of the housing of the reading portion 13, contact glasses CG1 and CG2 are fitted. The contact glass CG1 is used in a feed-reading mode; the contact glass CG2 is used in a stationary reading mode.

The reading portion 13 includes a document conveying unit 133. The document conveying unit 133 is fitted to the housing of the reading portion 13 so as to be pivotable with respect to it. The document conveying unit 133 conveys the reading target D.

In the feed-reading mode, the reading target D is set on the document conveying unit 133. The document conveying unit 133 conveys the reading target D toward the contact glass CG1. The reading portion 13 reads the reading target D that passes across the contact glass CG1.

On the other hand, in the stationary reading mode, the reading target D is set on the contact glass CG2. The reading portion 13 reads the reading target D on the contact glass CG2.

The printing portion 14 conveys the sheet P along a sheet conveyance passage (in FIG. 2, indicated by a broken-line arrow). The printing portion 14 also forms an image. The printing portion 14 prints the image on the sheet P being conveyed and outputs it. In an automatic filling job, which will be described later, a filled sheet FS (see the lower diagram in FIG. 3) is output.

The printing portion 14 includes a sheet feed roller 141. The sheet feed roller 141 is disposed in contact with a sheet P stored in a sheet cassette CA, and in that state rotates to feed the sheet P from the sheet cassette CA to the sheet conveyance passage.

The printing portion 14 includes a photosensitive drum 142a and a transfer roller 142b. The photosensitive drum 142a carries a toner image on its circumferential surface. The transfer roller 142b is disposed in pressed contact with the photosensitive drum 142a to form a transfer nip against it. The transfer roller 142b rotates together with the photosensitive drum 142a. The photosensitive drum 142a and the transfer roller 142b, while conveying a sheet P that has entered the transfer nip, transfer the toner image to the sheet P.

The printing portion 14 further includes, though not illustrated, a charging device, an exposure device, and a developing device. The charging device electrostatically charges the circumferential surface of the photosensitive drum. The exposure device forms an electrostatic latent image on the circumferential surface of the photosensitive drum. The developing device develops the electrostatic latent image on the circumferential surface of the photosensitive drum into a toner image.

The printing portion 14 includes a pair of fixing rollers 143. The pair of fixing rollers 143 includes a heating roller and a pressing roller. The heating roller incorporates a heater (not illustrated). The pressing roller is disposed in pressed contact with the heating roller to form a fixing nip against it. By rotating, the pair of fixing rollers 143, while conveying the sheet P that has entered the fixing nip, fixes the toner image transferred to the sheet P to the sheet P. The sheet P having passed through the fixing nip is discharged onto a discharge tray ET.

Referring back to FIG. 1, the image forming apparatus 1 includes an operation panel 15. The operation panel 15 includes a touch screen. The touch screen displays a screen. The touch screen accepts touch operations from a user. On the operation panel 15 are provided a plurality of hardware buttons including a Start button. The Start button is a button for accepting from the user an instruction to perform a job. By operating the Start button the user can request execution of an automatic filling job, which will be described later.

The operation panel 15 is connected to the controller 11. The controller 11 controls the displaying operation by the operation panel 15. The controller 11 also senses operation performed on the operation panel 15.

The image forming apparatus 1 includes a communication portion 16. The communication portion 16 includes a communication circuit. The communication portion 16 is connected to a network NT such as a LAN, the Internet, or a public telephone line. To the network NT, a personal information server 2 and an authorization management server 3 are communicably connected The image forming apparatus 1, the personal information server 2, and the authorization management server 3 together constitute an image processing system 10.

The controller 11 uses the communication portion 16 to access the personal information server 2 and the authorization management server 3. The controller 11 writes information to the personal information server 2 and reads information from the personal information server 2. The controller 11 writes information to the authorization management server 3 and reads information from the authorization management server 3.

Outline of an Automatic Filling Function: The image forming apparatus 1 is provided with an automatic filling function. In other words, the image forming apparatus 1 can perform a job related to the automatic filling function (hereinafter referred to as an automatic filling job). Now, with reference to FIG. 3, the automatic filling function will be described in outline.

When executing an automatic filling job, the user who wishes to use the automatic filling function prepares as the reading target D a sheet S with an entry field EF on it. The entry field EF is unfilled (it is a blank field). The sheet S is intended to be filled with personal information. For example, the sheet S is a form sheet that is going to be submitted to a predetermined department (e.g., human resources) of a corporation.

The sheet S can have a plurality of entry fields EF, though it may have only one entry field EF. One entry field F1 is to be filled with a name. Another entry field F2 is to be filled with an address. Another entry field F3 is to be filled with a telephone number. Another entry field F4 is to be filled with a birthday. Another entry field F3 is to be filled with a telephone number. Another entry field F5 is to be filled with a sex designation.

The entry field F5 on the sheet S has check boxes SC1 and SC2. When the submitter of the sheet S is a male, he is to check the check box SC1; when the submitter of the sheet S is a female, she is to check the check box SC2. The information with which the entry fields F1, F2, F3, F4, and F5 are to be filled is thus personal information.

The sheet S also has another entry field EF called a date field DF. The date field DF is to be filled with, for example, the date of submission. That is, the information with which the date field DF is to be filled is not personal information.

Figure 3:
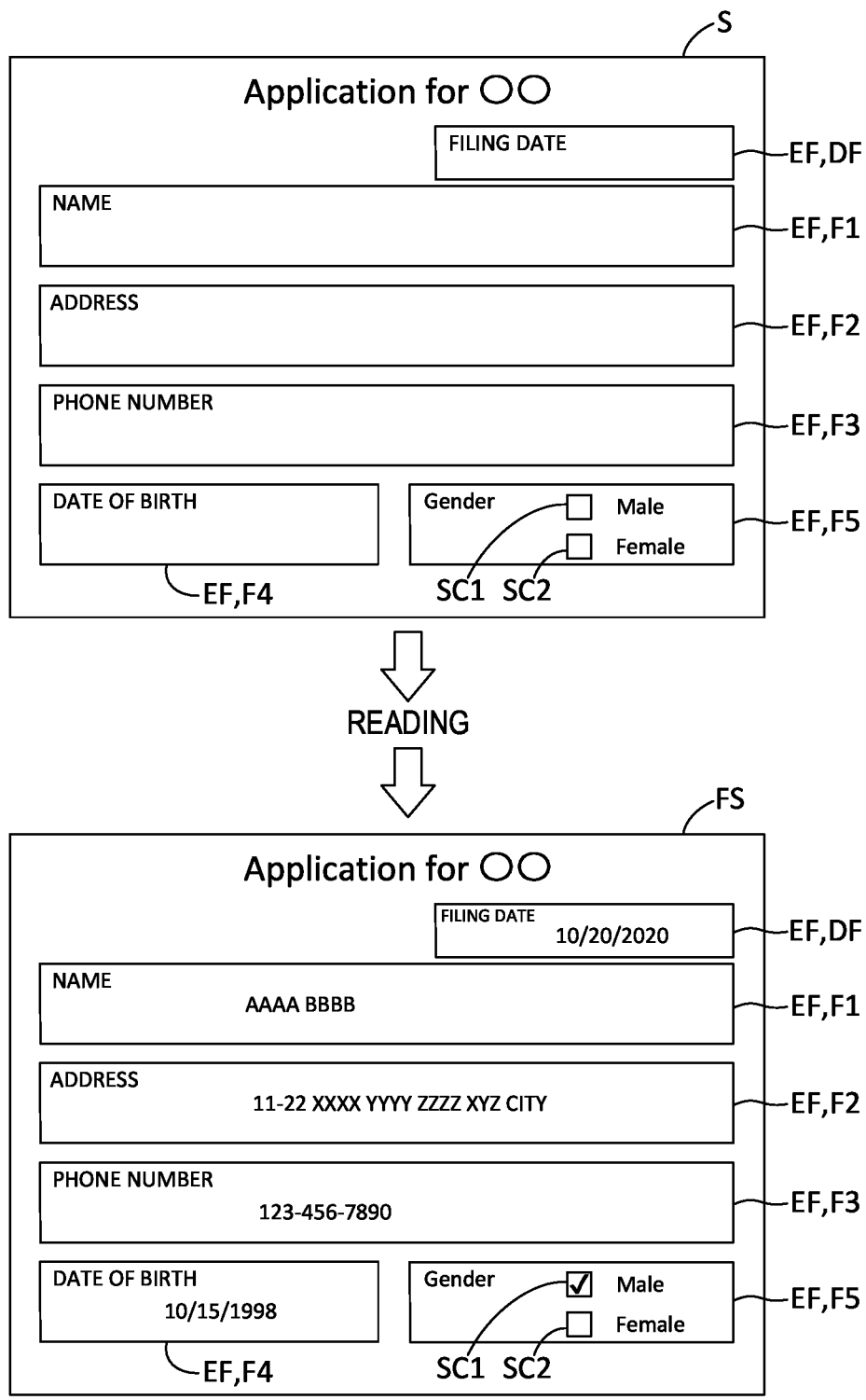
FIG. 3 is a diagram showing a sheet that is read by the image forming apparatus according to the embodiment and a filled sheet that is output by it.

The sheet S shown in FIG. 3 is a simplified version of an actual application form. The actual application form is intended to be filled with various kinds of information including a description. Moreover, depending on its kind, the sheet S can have varying layouts; it can have varying numbers of entry fields EF and be intended to be filled with varying kinds of information.

A user who wishes to use the automatic filling function sets as the reading target D the sheet S on the image forming apparatus 1. The user then requests execution of an automatic filling job on the operation panel 15. This starts an automatic filling job.

The operation panel 15 accepts from the user a setting of whether to enable or disable the automatic filling function. The operation panel 15 accepts operation on the Start button with the automatic filling function enabled as a request to execute an automatic filling job. In response to the operation panel 15 accepting the request to execute an automatic filling job, the controller 11 starts the automatic filling job.

On accepting the request to execute an automatic filling job, the controller 11 makes the reading portion 13 read the sheet S with the entry fields EF blank (see the upper diagram in FIG. 3). The controller 11 moreover generates output data of a filled sheet FS (see the lower diagram in FIG. 3) with entry fields EF on it filled with personal information. Then the controller 11 makes the printing portion 14 perform printing based on the output data. The printing portion 14 prints and outputs the filled sheet FS.

Registering Personal Information: The operation panel 15 accepts from each user a request for regular registration of personal information. Personal information includes a name, an address, a telephone number, a birthday, a sex designation, and the like. That is, personal information classifies into a plurality of items (name, address, telephone number, birthday, sex designation, and the like).

For example, in response to a request for regular registration of personal information, the operation panel 15 displays, though not illustrated, a regular registration screen. The regular registration screen has a plurality of entry fields that respectively correspond to a plurality of items of personal information. On receiving a touch operation in any of the entry fields, the operation panel 15 displays a software keyboard to accept information corresponding to the touch-operated entry field. The user operates the software keyboard to enter personal information.

The controller 11 recognizes the user who has requested regular registration of personal information. The controller 11 recognizes as the regular registration-requesting user the user who was logged in on the image forming apparatus 1 when the controller 11 accepted the request for regular registration of personal information. The controller moreover recognizes the information entered on the regular registration screen as the personal information of the regular registration-requesting user.

The controller 11 then registers the personal information entered on the regular registration screen in association with the regular registration-requesting user. While doing this the controller 11 accesses the personal information server 2. The controller 11 makes the personal information server 2 store the personal information of the regular registration-requesting user. Here, if the personal information server 2 can be accessed from a user terminal (such as a personal computer or a smartphone), the personal information may be registered from the user terminal.

Here the operation panel 15 accepts from the user a request for scanning registration. In scanning registration, the user can by simply scanning a personal identification document (such as a driver's license or a passport) register personal information. For example, on accepting a request for scanning registration, the operation panel 15 displays a message (not illustrated) prompting the user to set the personal identification document as the reading target D and then press the Start button. Thus the personal identification document is set on the reading portion 13 and the Start button on the operation panel 15 is pressed.

The controller 11 recognizes the user who has requested scanning registration of personal information. The controller 11 then makes the reading portion 13 read the personal identification document. Here, the scanning registration-requesting user corresponds to a "registration-requesting user".

The controller 11 acquires read data (image data) obtained through the reading of the personal identification document. The controller 11 then performs OCR processing on the read data of the personal identification document. The controller 11 moreover performs natural language processing on the text data extracted through OCR processing. Thus the controller 11 recognizes the personal information on the personal identification document read by the reading portion 13.

The controller 11 then registers the personal information on the personal identification document read by the reading portion 13 as the personal information of the scanning registration-requesting user. Specifically the controller 11 accesses the personal information server 2 and makes it store the personal information on the personal identification document read by the reading portion 13 in association with the scanning registration-requesting user.

Personal information may be stored in the storage portion 12. In that case the personal information server 2 can be omitted.

Here the scanning registration-requesting user can be one who registered personal information earlier (either through regular registration or scanning registration). That is, personal information that the scanning registration-requesting user registered earlier may be stored on the personal information server 2. In the following description, the personal information on the personal identification document newly read by the reading portion 13 will be referred to as the latest information, and the personal information that the scanning registration-requesting user registered earlier (i.e., the personal information already stored on the personal information server 2) will be referred to as the existing information.

If existing information is found, the controller 11 compares the latest information with the existing information. If the latest and existing information differ, the controller 11 makes the operation panel 15 accept a choice of whether to update personal information.

In response to the operation panel 15 accepting a choice to update personal information, the controller 11 updates based on the latest information the personal information of the scanning registration-requesting user. In response to the operation panel 15 accepting a choice not to update personal information, the controller 11 does not update the personal information of the scanning registration-requesting user.

For example, in a case where between the latest and existing information a given item of information among the plurality of items differs, the controller 11 recognizes the item that differs between the latest and existing information as an inconsistent item. The controller 11 then alters the inconsistent item of information in the registered personal information based on the latest information.

On the other hand, the controller 11 recognizes an item that is in the latest information but not in the existing information as a new item. The controller 11 then adds the new item of information to the registered personal information.

Figure 4:
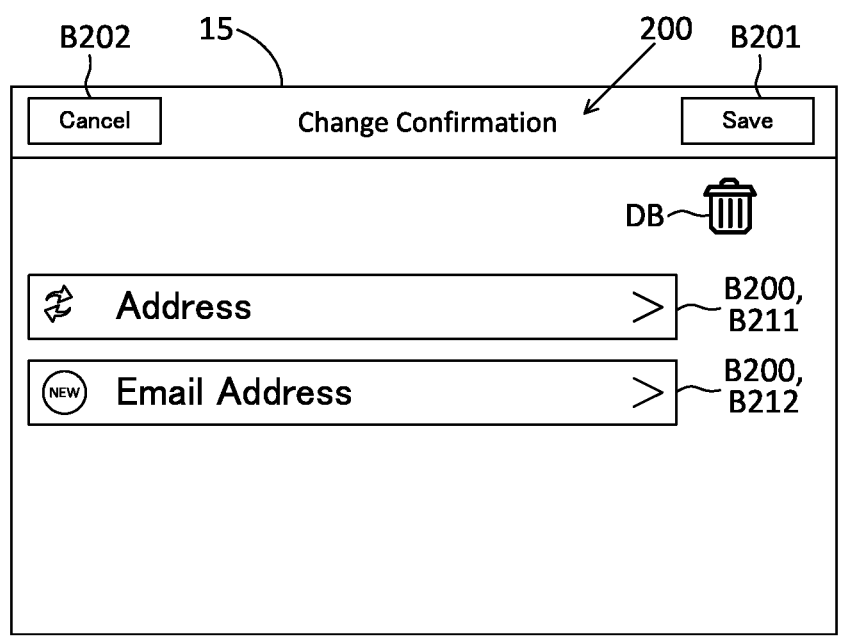
FIG. 4 is a diagram showing a confirmation screen that is displayed by an operation panel on the image forming apparatus according to the embodiment.

For example, the operation panel 15 displays a confirmation screen 200 as shown in FIG. 4 and accepts from the scanning registration-requesting user a choice of whether to update the registered personal information. The confirmation screen 200 has a save button B201 and a Cancel button B202. On sensing operation on the Save button B201, the controller 11 recognizes the operation panel 15 to have accepted a choice to update the registered personal information. On sensing operation on the Cancel button B202, the controller 11 recognizes the operation panel 15 to have accepted a choice not to update the registered personal information.

The confirmation screen 200 also has item buttons B200. The item buttons B200 include an item button B211 that corresponds to an inconsistent item and an item button B212 that corresponds to a new item. In the example shown in FIG. 4, the item "Address" corresponds to an inconsistent item, and the item "Email Address" corresponds to a new item.

Figure 5:
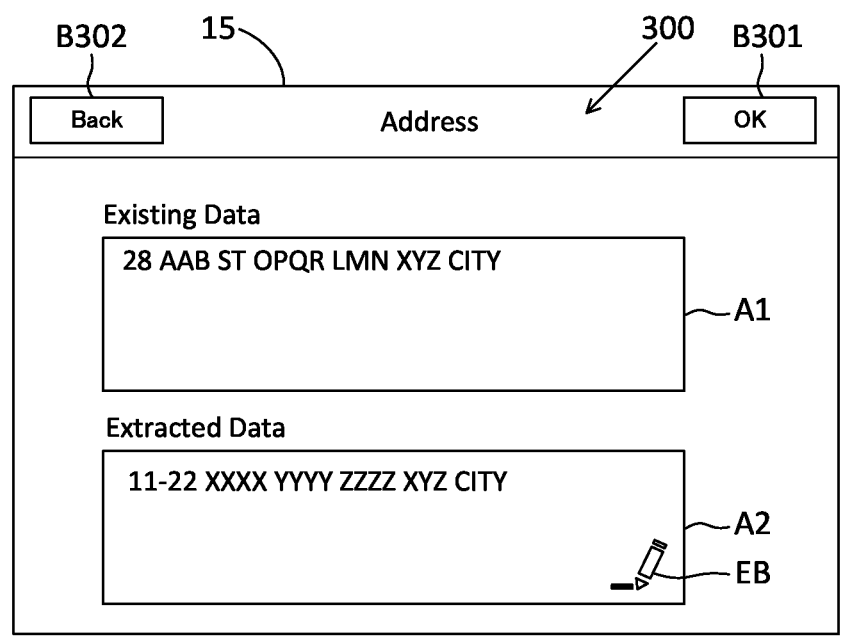
FIG. 5 is a diagram showing a detail confirmation screen that is displayed by the operation panel on the image forming apparatus according to the embodiment.

On sensing operation on an item button B211 corresponding to an inconsistent item, the controller 11 makes the operation panel 15 display a detail confirmation screen 300 as shown in FIG. 5. The detail confirmation screen 300 has an existing information field A1 and a latest information field A2. In the existing information field A1 is shown the inconsistent item of information in the existing information. In the latest information field A2 is shown the inconsistent item of information in the latest information. Thus the user can readily see differences between the electrostatic latent image.

As the case may be, a plurality of inconsistent items may be found. In such a case, the operation panel 15 displays, though not illustrated, a confirmation screen 200 that has a plurality of item buttons B211 that respectively correspond to the plurality of inconsistent items. Then, on sensing operation on one of the item buttons B211, the controller 11 recognizes the item corresponding to the operated item button B211 and makes the operation panel 15 show a detail confirmation screen 300 corresponding to the recognized item.

The detail confirmation screen 300 shown in FIG. 5 corresponds to the item "Address". If in addition to the item "Address" the item "Name" is found to be inconsistent, the confirmation screen 200 has two item buttons B211 that correspond to the items "Address" and "Name" respectively. When the item button B211 corresponding to the item "Name" is operated, a detail confirmation screen 300 corresponding to the item "Name" is displayed.

Likewise, if a plurality of new items are found, the confirmation screen 200 has a plurality of item buttons 212 that respectively correspond to the plurality of new items.

The latest information field A2 on the detail confirmation screen 300 has an Edit button EB. On sensing operation on the Edit button EB, the operation panel 15 shows, though not illustrated, a software keyboard. The operation panel 15 accepts operation (operation on the software keyboard) for editing the inconsistent item of information in the latest information. That is, the user can edit the information shown in the latest information field A2. The user can then register the edited information.

The detail confirmation screen 300 has an OK button B301 and a Back button B302. On sensing operation on the OK button B301, the controller 11 takes as fixed the edited result on the detail confirmation screen 300. On sensing operation on the Back button B302, the controller 11 makes the operation panel 15 display the confirmation screen 200.

On sensing operation on the item button B212 corresponding to a new item on the confirmation screen 200, the controller 11 makes the operation panel 15 display, though not illustrated, a detail confirmation screen corresponding to the new item. The detail confirmation screen for the new item shows the new item of information in the latest information. The detail confirmation screen for the new item, like the detail confirmation screen 300 for an inconsistent item shown in FIG. 5, accepts editing operation. The detail confirmation screen for the new item has a button similar to the OK button B301 and a button similar to the Back button B302.

The confirmation screen 200 has a Delete button DB. For example, on sensing operation on the Delete button DB, the controller 11 enters a deletion mode. After transition to the deletion mode, on sensing operation on one of the item buttons B200, the controller 11 recognizes the item that corresponds to the operated item button B200 as an item to be deleted, and deletes the information corresponding to the item to be deleted.

For example, after transition to the deletion mode, when the item button B211 corresponding to the item "Address" is operated, this item button B211 disappears. When in this state the Save button B201 is operated, the information of the item "Address" as personal information is not changed. In this example, only the information of the item "Email Address" is added to the personal information.

For another example, after transition to the deletion mode, when the item button B212 corresponding to the item "Email Address" is operated, this item button B212 disappears. When in this state the Save button B201 is operated, the information of the item "Address" as personal information is changed, but the information of the item "Email Address" is not added.

Thus the operation panel 15 displays the confirmation screen 200 and accepts from the user a choice of what information to change. The operation panel 15 also displays the confirmation screen 200 and accepts from the user a choice of what information to add.

Registering an Authorized User: The operation panel 15 accepts, from a user (hereinafter referred to as a registered user) who has registered personal information, registration of a user (hereinafter referred to as an authorized user) whom the registered user permits to access the registered user's personal information. An authorized user is thus a user who is permitted by a registered user to browse and output (print) personal information.

For example, when making the operation panel 15 accept registration of an authorized user, the controller 11 generates a user list (new item) that lists user names as candidates. The controller 11 then makes the operation panel 15 display the user list. The operation panel 15 accepts operation (e.g., touch operation on the display area of a user on the list) to select a user from the user list. The controller 11 recognizes the selected user as a user to be authorized. From the user list, one user may be selected or a plurality of users may be selected.

The controller 11 generates authorization information in which the authorized user is associated with the registered user who has selected that authorized user (i.e., the user who was logged in on the image forming apparatus 1 when registration of the authorized user was accepted). The controller 11 then accesses the authorization management server 3 to make it store the authorization information.

The controller 11 generates authorization information for each registered user and makes the authorization management server 3 store it. In response to the operation panel 15 accepting registration of an authorized user, the controller 11 adds information on the newly registered authorized user to the authorization information of the registered user who registered him or her this time.

Here the personal information that a user can access varies with the group and the role the user is in. Accordingly the authorization information of each user further includes information on the group and the role the user is in. For example, in a corporation, departments correspond to groups, and posts correspond to roles.

Authorization information may be stored in the storage portion 12. In that case, the authorization management server 3 can be omitted.

Procedure for an Automatic Filling Job: With reference to the flow chart in FIG. 6, the procedure performed by the controller 11 when executing an automatic filling job will be described below.

Figure 6:
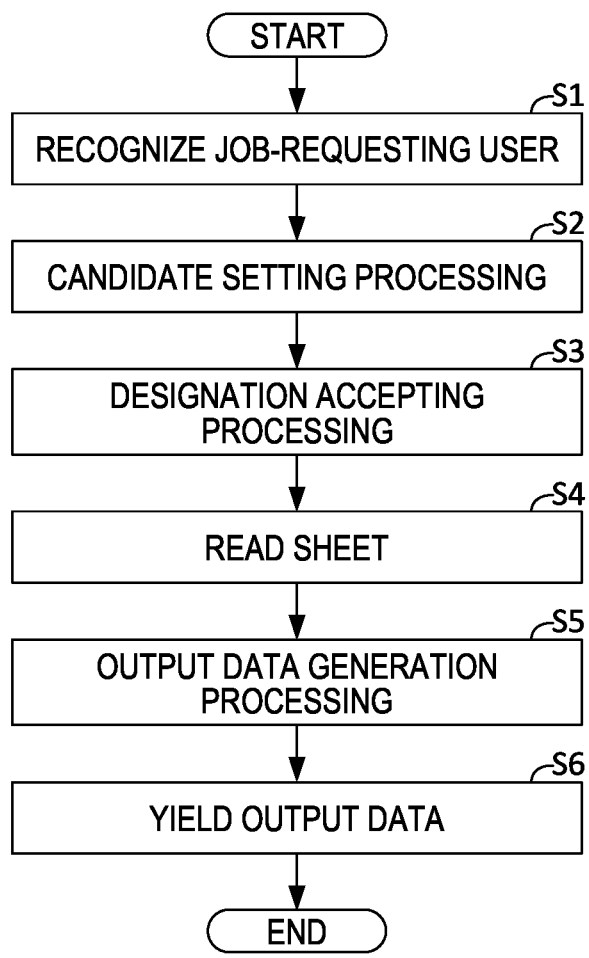
FIG. 6 is a flow chart showing a procedure performed by a controller in the image forming apparatus according to the embodiment.

It is assumed that, when the procedure shown in FIG. 6 starts, a sheet S with entry fields EF blank (see the upper diagram in FIG. 3) is set as the reading target D on the reading portion 13. When the controller 11 recognizes to have received a request to execute an automatic filling job (when it recognizes the Start button on the operation panel 15 to have been operated), the procedure shown in FIG. 6 starts.

At step S1, the controller 11 recognizes the user who is currently logged in on the image forming apparatus 1 (hereinafter referred to as the logged-in user). The controller 11 recognizes the logged-in user as the job-requesting user who has requested execution of an automatic filling job.

Here, in an automatic filling job, the job-requesting user can print and output another registered user's personal information. Thus the job-requesting user can learn another registered user's personal information. However, to execute an automatic filling job on the image forming apparatus 1, a user needs to log in on the image forming apparatus 1. That is, an outsider who cannot log in on the image forming apparatus 1 cannot execute an automatic filling job on the image forming apparatus 1. Thus personal information is protected from being leaked to outsiders.

At step S2, the controller 11 performs candidate setting processing to set candidates. When performing candidate setting processing, the controller 11 communicates with the authorization management server 3 to check the authorization information of a registered user. The image forming apparatus 1 then recognizes the job-requesting user as a registered user who is registered as an authorized user, and sets this registered user as a candidate.

The controller 11 also communicates with the authorization management server 3 to check the authorization information of the job-requesting user. That is, the controller 11 recognizes the group the job-requesting user belongs to and recognizes the role the job-requesting user is in. Then the controller 11 checks whether or not the job-requesting user is in a predetermined role. Here, for example, it is checked whether or not the job-requesting user is a manager of the group to which he or her belongs. That is, the predetermined role is a managerial post. The predetermined role may be modified as desired.

On finding the job-requesting user to be in the predetermined role, the controller 11 recognizes registered users who belong to the same group as the job-requesting user. The controller 11 then sets as candidates all the registered users who belong to the same group as the job-requesting user irrespective of whether they have registered the job-requesting user as an authorized user.

That is, a registered user who has registered the job-requesting user as an authorized user is set as a candidate even if the registered user does not belong to the same group as the job-requesting user. A registered user who belongs to the same group as the job-requesting user in the predetermined role is set as a candidate even if the registered user has not registered the job-requesting user as an authorized user.

The controller 11 sets the job-requesting user as a candidate.

Now, the candidate setting processing will be described with reference to FIG. 7. In the following description, it is assumed that a corporation has a group G1, and that the group G1 includes groups G11 and G12.

A user who manages the group G1 (who is in the predetermined role) is indicated by the symbol DM. The user DM belongs to the group G1.

A user who belongs to the group G11 and who manages the group G11 (who is in the predetermined role) is indicated by the symbol M1. An ordinary user who belongs to the group G11 is indicated by the symbol N1.

Likewise, s user who belongs to the group G12 and who manages the group G12 (who is in the predetermined role) is indicated by the symbol M2. An ordinary user who belongs to the group G12 is indicated by the symbol N2.

First, consider an example where the user DM is the job-requesting user. The user DM is in the predetermined role (is the manager of the group G1) and belongs to the group G1. Accordingly, the users M1, M2, N1, and N2 are all set as candidates. The user DM too is set as a candidate. Thus all the users who belong to the same group G1 as the user DM are set as candidates.

Next, consider another example where the user M1 is the job-requesting user. The user M1 is in the predetermined role (is the manager of the group G11) and belongs to the group G11. Accordingly, the user N1 is set as a candidate. The user M1 too is set as a candidate. Thus all the users who belong to the same group G11 as the user M1 are set as candidates. On the other hand, the users DM, M2, and N2, who do not belong to the group G11, are not set as candidates.

Next, consider another example where the user M1, who belongs to the group G11 and is in the predetermined role, is the job-requesting user and where an ordinary user N2 who belongs to the group G12 (this user is indicated by the symbol N20) has registered the user M1 as an authorized user. In this example, in addition to the user N1 the user N20 too is set as a candidate. If also the user M2 has registered the user M1 as an authorized user, the user M2 too is set as a candidate.

Next, consider another example where an ordinary user N1 who belongs to the group G11 (this user is indicated by the symbol N10) is the job-requesting user. Here the user N10 is an ordinary user and is not in the predetermined role. Thus only the user N10 is set as a candidate.

Next, consider another example where the user N10 is the job-requesting user, in addition where, in the group G11, the user M1 has registered the user N10 as an authorized user, and further where an ordinary user N1 (this user is indicated by the symbol N100) has registered the user N10 as an authorized user. In this case, in addition to the user N10 the users M1 and N100 are set as candidates.

Next, consider another example where the user N10 is the job-requesting user and where the user N20 has registered the user N10 as an authorized user. In this case, although the users N10 and N20 belong to different groups, in addition to the user N10 the user N20 is set as a candidate. If the user M2 has registered the user N10 as an authorized user, the user M2 too is set as a candidate.

Figure 8:
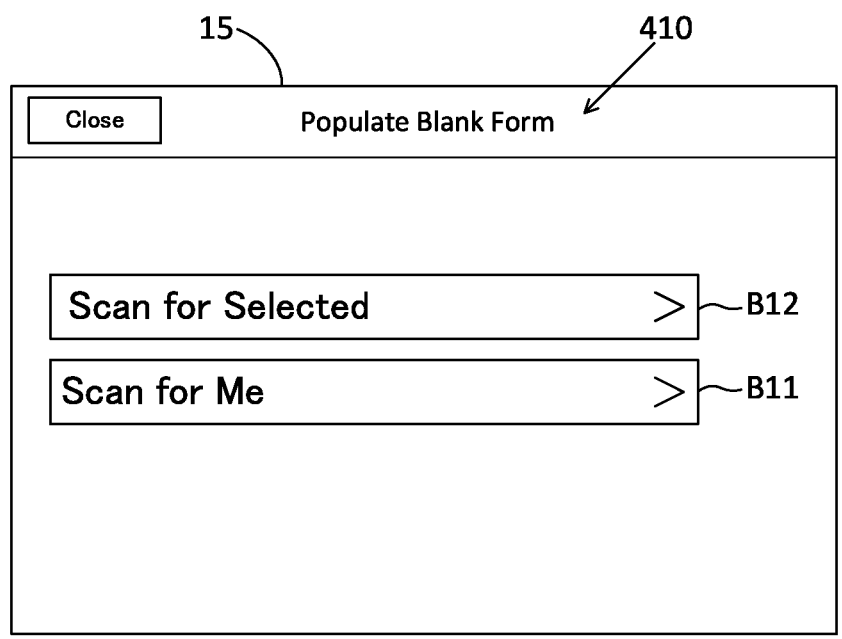
FIG. 8 is a diagram showing a first setting screen displayed by the operation panel on the image forming apparatus according to the embodiment.

Referring back to FIG. 6, after candidate setting processing, at step S3, the controller 11 performs designation accepting processing. Specifically, the controller 11 makes the operation panel 15 accept designation of a registered user who have been set as candidates. At this time the operation panel 15 displays a first setting screen 410 as shown in FIG. 8. The first setting screen 410 has in the hierarchical rank immediately below it a second setting screen 420 (see FIG. 9), a third setting screen 430 (see FIG. 10), a fourth setting screen 440 (see FIG. 11), and a fifth setting screen 450 (see FIG. 12). The first to fifth setting screens 410 to 450 accept from the job-requesting user operation to designate a registered user.

In an automatic filling job, the controller 11 recognizes a designated user as a target user, and fills the entry fields EF with the target user's personal information. That is, the first to fifth setting screens 410 to 450 accept from the job-requesting user operation to set whose personal information to fill the entry fields EF with.

As shown in FIG. 8, the first setting screen 410 has a button B11. The button B11 is a button for accepting designation of the job-requesting user. The button B11 is shown unexceptionally on the first setting screen 410.

On sensing operation on the button B11, the controller 11 recognizes that the job-requesting user designates him or herself (the job-requesting user is designated). In this case, the controller 11 recognizes the job-requesting user as a target user.

Figure 13:
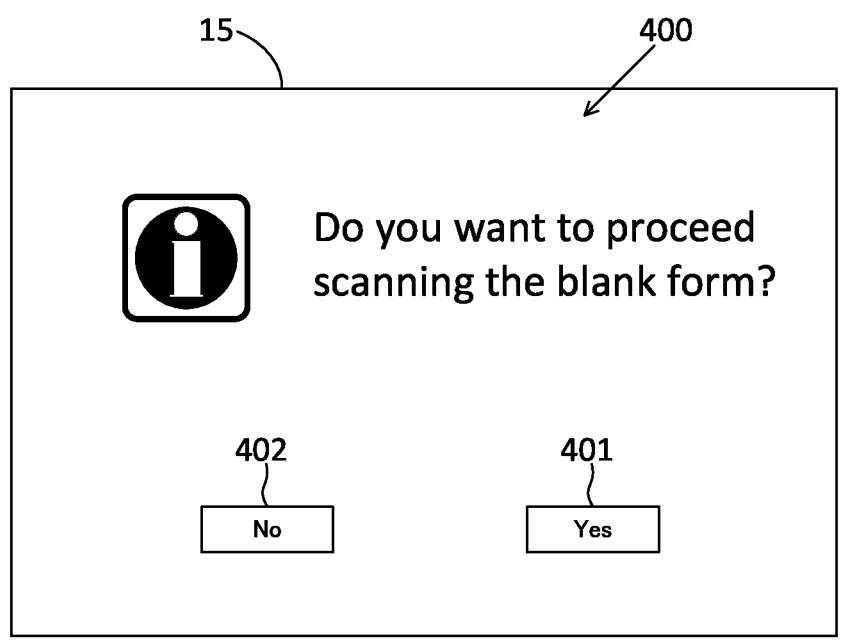
FIG. 13 is a diagram showing a dialog box displayed by the operation panel on the image forming apparatus according to the embodiment.

Moreover, on sensing operation on the button B11, the controller 11 makes the operation panel 15 show a dialog box 400 as shown in FIG. 13. The dialog box 400 has a Yes button 401 and a No button 402.

On sensing operation on the Yes button 401, the controller 11 ends designation accepting processing. In other words, the controller 11 proceeds to the next step (continues with the automatic filling job). For example, when the button B11 is operated and then, without any other operation performed, the Yes button 401 is operated, the job-requesting user becomes the sole target user.

On sensing operation on the No button 402, the controller 11 does not end designation accepting processing. If the operating user, after operating the button B11 to have the dialog box 400 displayed, wishes to continue to designate another registered user, he or she can operate the No button 402.

As shown in FIG. 8, the first setting screen 410 can have, in addition to the button B11, a button B12. The button B12 is a button for accepting designation of a registered user other than the job-requesting user.

Figure 7:
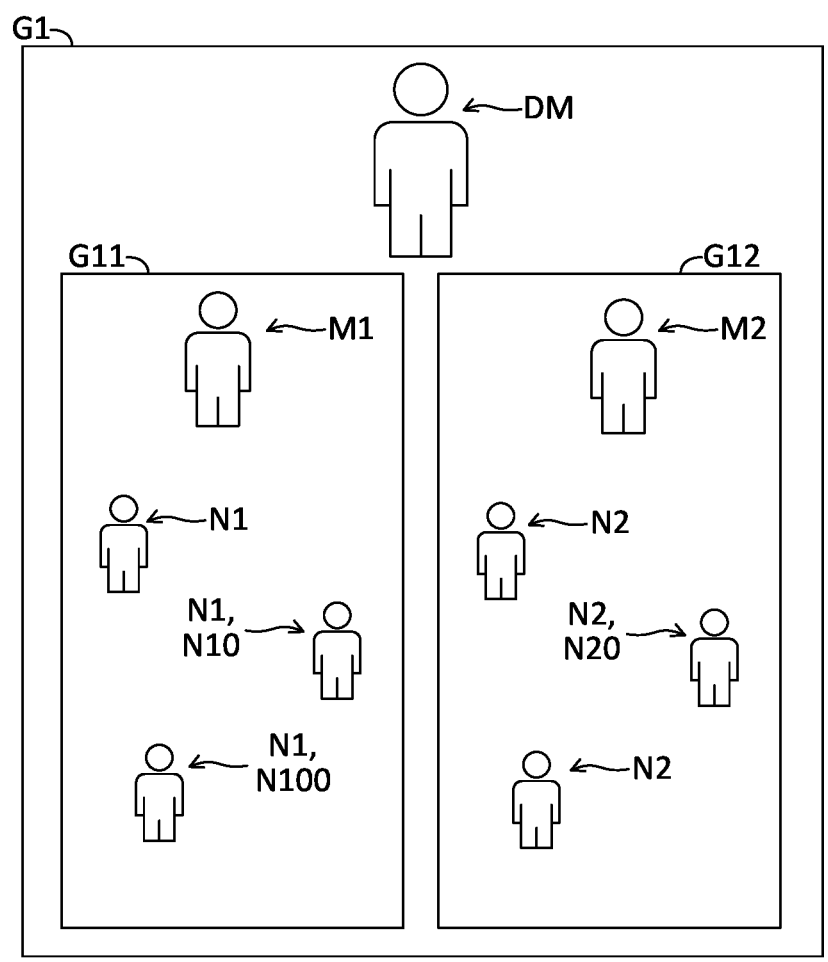
FIG. 7 is a diagram illustrating candidate setting processing performed by the controller in the image forming apparatus according to the embodiment.

For example, in the example shown in FIG. 7, if one of the users DM, M1, and M2 is the job-requesting user, the button B12 is shown. That is, the users DM, M1, and M2 can designate a registered user other than themselves.

Even if an ordinary user is the job-requesting user, if the ordinary user has been registered as an authorized user, the button B12 is shown. For example, consider a case where the user N10, who is an ordinary user, has been registered as an authorized user. In this example, although the user N10 is an ordinary user, if the user N10 is the job-requesting user, the button B12 is shown. That is, the user N10 can designate a registered user other than him or herself.

If the job-requesting user is an ordinary user and in addition has not been registered as an authorized user, the button B12 is not shown. In this case, the job-requesting user cannot designate a registered user other than him or herself.

Figure 9:
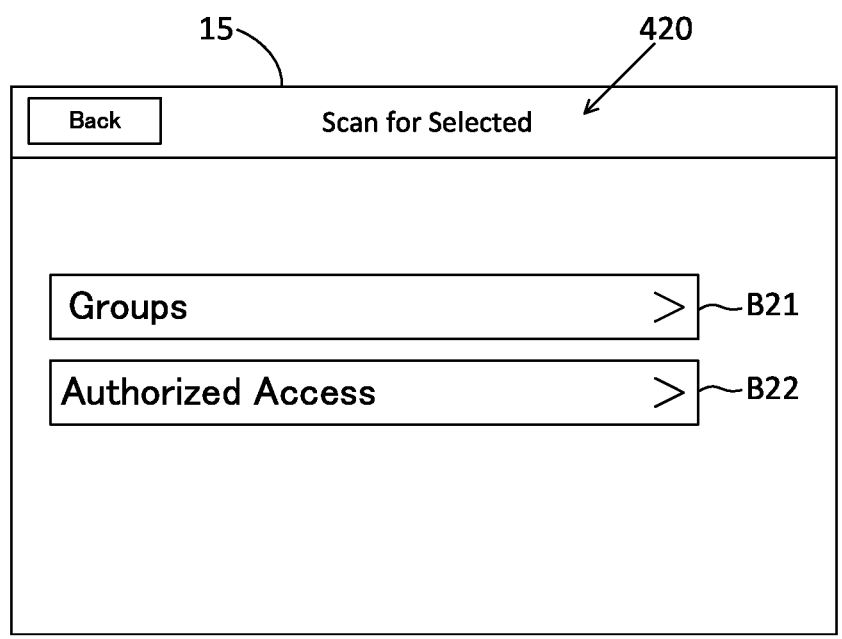
FIG. 9 is a diagram showing a second setting screen displayed by the operation panel on the image forming apparatus according to the embodiment.

On sensing operation on the button B12 on the first setting screen 410, the controller 11 makes the operation panel 15 display the second setting screen 420 (see FIG. 9). The second setting screen 420 has at least one of buttons B21 and B22. FIG. 9 shows, as one example, the second setting screen 420 that shows both of the button B21 and B22.

If a registered user who is in the predetermined role (a manager user) is the job-requesting user, the button B21 is shown. On the other hand, if a registered user who has been registered as an authorized user is the job-requesting user, the button B22 is shown. If the job-requesting user is in the predetermined role and in addition has been registered as an authorized user, both the buttons B21 and B22 are shown.

For example, in the example shown in FIG. 7, if the job-requesting user is the user M1, at least the button B21 is shown. In addition, if the user M1 has been registered as an authorized user, the button B22 too is shown. If the user M1 has not been registered as an authorized user, only the button B21 is shown.

On the other hand, if an ordinary user is the job-requesting user, the button B21 is not shown. If an ordinary user who has been registered as an authorized user is the job-requesting user, the button B22 is shown. For example, the user N10, who is an ordinary user, has been registered as an authorized user. Thus, if the user N10 is the job-requesting user, only the button B22 is shown.

Figure 10:
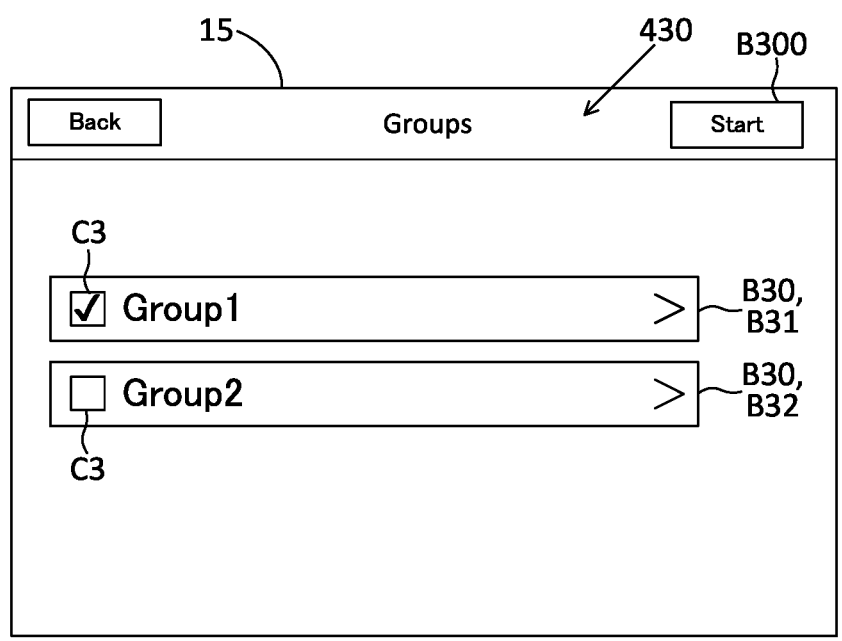
FIG. 10 is a diagram showing a third setting screen displayed by the operation panel on the image forming apparatus according to the embodiment.

On sensing operation on the button B21 on the second setting screen 420, the controller 11 makes the operation panel 15 display the third setting screen 430 (see FIG. 10). The third setting screen 430 has buttons B30. The number of buttons B30 varies with the number of groups that the job-requesting user manages. For example, in the example shown in FIG. 7, consider a case where the user DM is the job-requesting user. In this case, the third setting screen 430 shown in FIG. 10 is displayed.

If the user DM is the job-requesting user, a button B30 (indicated by the symbol B31) that corresponds to the group G1 and a button B30 (indicated by the symbol B32) that corresponds to a group G2 are shown. Though not illustrated, if the user M1 is the registered user, only the button B31 is shown; if the user M2 is the job-requesting user, only the button B32 is shown.

Thus the buttons B30 corresponding to the groups that are managed by the job-requesting user (the user who is in the predetermined role) are shown. If the job-requesting user manages a plurality of groups, a plurality of buttons B30 respectively corresponding to those groups are shown. If the job-requesting user manages one group, a button B30 corresponding to that one group is shown.

On sensing operation on a button B30, the controller 11 makes the operation panel 15 perform processing to check a check box C3 on the operated button B30. On sensing operation on a button B30 with its check box C3 checked, the controller 11 makes the operation panel 15 perform processing to uncheck the check box C3 on that button B30.

The controller 11 recognizes as a target group a group that correspond to a button B30 with its check box C3 checked. On sensing operation on a button B300 on the third setting screen 430 with its check box C3 checked, the controller 11 recognizes that all the registered users who belong to the target group are designated. That is, the controller 11 recognizes as target users all the registered users belonging to the target group.

Figure 11:
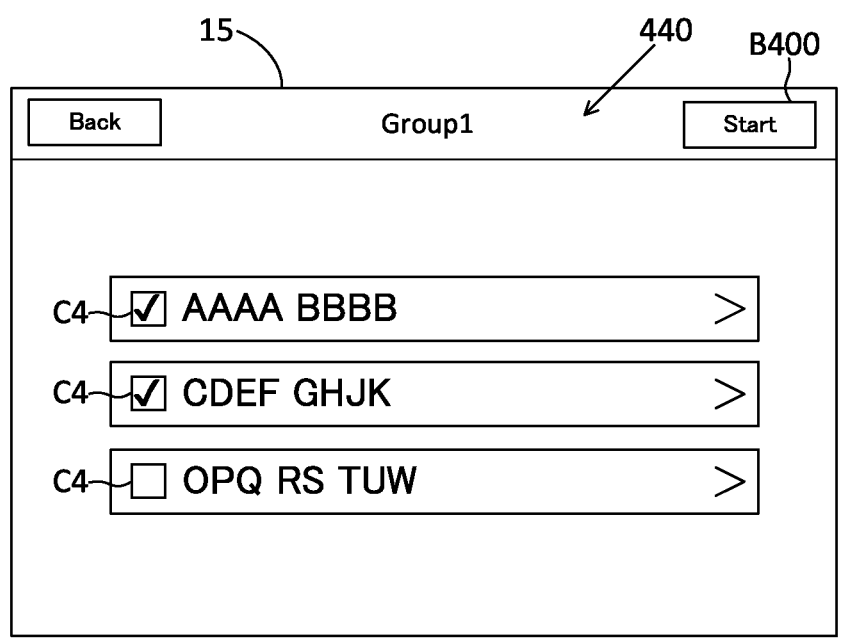
FIG. 11 is a diagram showing a fourth setting screen displayed by the operation panel on the image forming apparatus according to the embodiment.
Figure 12:
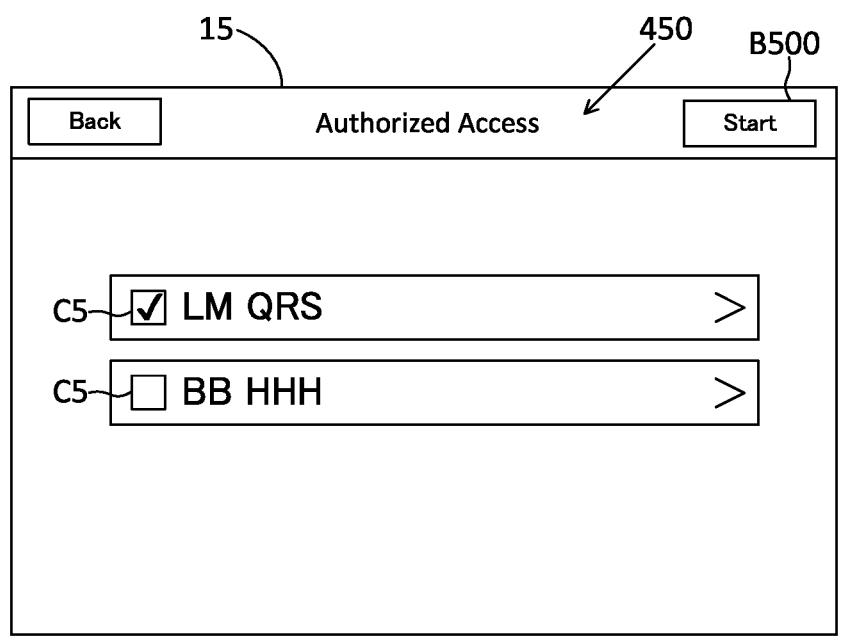
FIG. 12 is a diagram showing a fifth setting screen displayed by the operation panel on the image forming apparatus according to the embodiment.

Incidentally, on sensing a predetermined operation (e.g., a long press) on a button B30 with its check box C3 checked, the controller 11 makes the operation panel 15 display the fourth setting screen 440 (see FIG. 11). The fourth setting screen 440 lists the user names of the registered users who belong to the target group. Each user name has a check box C4.

On sensing operation on a checked check box C4, the controller 11 makes the operation panel 15 perform processing to uncheck the operated check box C4. On sensing operation on an unchecked check box C4, the controller 11 makes the operation panel 15 perform processing to check the operated check box C4. On sensing operation on a button B400 on the fourth setting screen 440, the controller 11 makes the operation panel 15 display the third setting screen 430.

Thereafter, on sensing operation on the button B300 on the third setting screen 430, the controller 11 recognizes that, from the target group, a registered user with the corresponding check box C4 checked is designated, and recognizes this registered user as a target user. That is, the fourth setting screen 440 permits selective cancellation of designation of a registered user. When a group has just been designated on the third setting screen 430, all the registered users who belongs to the target group are designated. Accordingly, when the operating user wishes to designate all the registered users belonging to the target group, no setting is needed on the fourth setting screen 440.

On sensing the button B300 on the third setting screen 430, the controller 11 makes the operation panel 15 display a dialog box 400 (see FIG. 13). That is, the controller 11 makes the operation panel 15 accept a choice of whether or not to end designation accepting processing.

On sensing operation on the button B22 on the second setting screen 420 (see FIG. 9), the controller 11 recognizes a registered user who has registered the job-requesting user as an authorized user. Then the controller 11 makes the operation panel 15 display the fifth setting screen 450 (see FIG. 12). The fifth setting screen 450 lists the user names of registered users who have registered the job-requesting user as an authorized user. Each user name has a check box C5.

On sensing operation on a checked check box C5, the controller 11 makes the operation panel 15 perform processing to uncheck the operated check box C5. On sensing operation on an unchecked check box C5, the controller 11 makes the operation panel 15 perform processing to check the operated check box C5.

On sensing operation on a button B500 on the fifth setting screen 450, the controller 11 recognizes that a registered user with the corresponding check box C5 checked is designated. That is, the controller 11 recognizes as a target user a registered user with the corresponding check box C5 checked.

Moreover, on sensing operation on the button B500, the controller 11 makes the operation panel 15 display the dialog box 400 (see FIG. 13). That is, the controller 11 makes the operation panel 15 accept a choice of whether or not to end designation accepting processing.

For example, in the example shown in FIG. 7, consider a case where the job-requesting user is the user DM and where the user DM intends to designate the user N10.

In this case, the user DM first makes the operation panel 15 display the first setting screen 410 (see FIG. 8). If the user DM is the job-requesting user, the buttons B11 and B12 are both shown.

With the first setting screen 410 displayed, the user DM operates the button B12. This results in the second setting screen 420 (see FIG. 9) being displayed on the operation panel 15. If the user DM is the job-requesting user, the button B21 is shown unexceptionally. If the user DM has been registered as an authorized user, the button B22 too is shown.

With the second setting screen 420 displayed, the user DM operates the button B21. This results in the third setting screen 430 (see FIG. 10) being displayed. If the user DM is the job-requesting user, the button B31 corresponding to the group G1 and the button B32 corresponding to the group G2 are shown.

Here, the user N10 belongs to the group G1. Accordingly the user DM operates the button B31 corresponding to the group G1. Thus the fourth setting screen 440 (see FIG. 11) is displayed.

The fourth setting screen 440 lists the user names of registered users who belong to the group G1. The user DM so operates that at least the check box C4 corresponding to the user N10 is checked. To designate only the user N10, the operating user can uncheck all the other check boxes.

Then the user DM operates the button B400 on the fourth setting screen 440. This results in the user N10 being designated. At this time, the dialog box 400 (see FIG. 13) is shown. If the operating user does not designate any other registered user, he or she can operate the Yes button 401.

The controller 11 communicates with the personal information server 2. The controller 11 then recognizes the target user's personal information.

Referring back to FIG. 6, after designation accepting processing, the procedure advances to step S4. In other words, when the Yes button 401 on the dialog box 400 is operated, the procedure advances to step S4. At step S4, the controller 11 makes the reading portion 13 read the sheet S.

At step S5, the controller 11 acquires read data (the image data of the sheet S) obtained as a result of the reading portion 13 reading the sheet S. The controller 11 then performs output data generation processing. In output data generation processing, output data of a filled sheet FS in which entry fields EF are filled with a target user's personal information is generated. One example of output data generation processing will now be described.

In a coordinate system with its origin (0, 0) at the upper left corner of the read data (image data), the controller 11 recognizes the position of a blank field area (a frame demarcating a blank area) present in the read data). The controller 11 moreover performs OCR processing on the read data. The controller 11 further performs natural language processing on the text data extracted through OCR processing. In this way the controller 11 locates the position of an area corresponding to an entry field EF (an area to be filled with personal information). The controller 11 also recognizes the items of personal information with which to fill the blank field area. For example, if a blank area indicated with the text "Name" is located as an area corresponding to an entry field EF, the item of personal information that corresponds to that blank area is recognized as the item "Name".

The controller 11 also recognizes the position of a check box present in the read data. If a check box is present in a blank area corresponding to an entry field EF, the controller 11 recognizes that the information with which to fill that blank area is a check mark.

Figure 14:
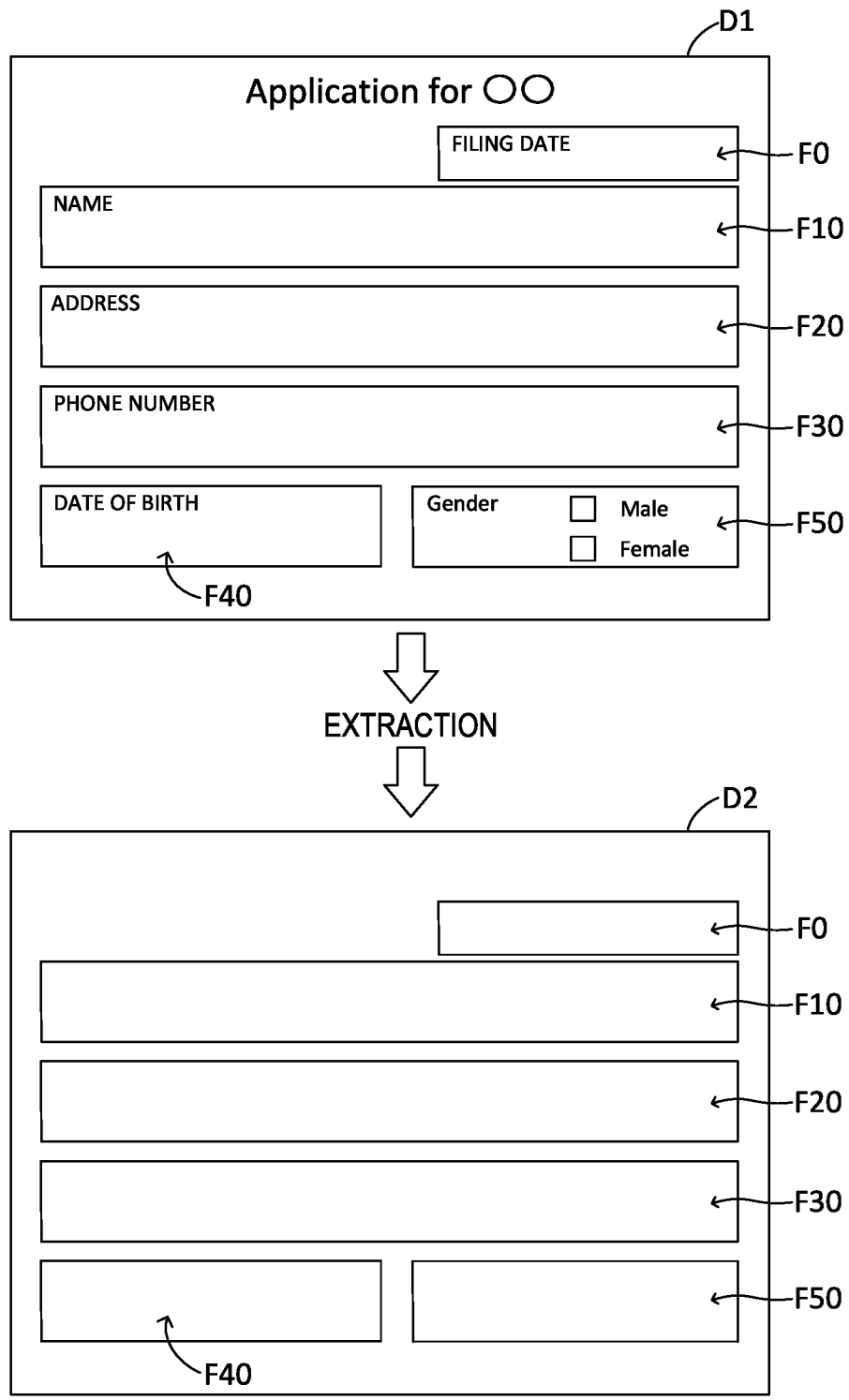
FIG. 14 is a diagram illustrating output data generation processing performed by the controller in the image forming apparatus according to the embodiment.

As shown in FIG. 14, the controller 11 sets the read data (image data) obtained as a result of the reading portion 13 reading the sheet S as first data D1. Moreover the controller 11 extracts from the first data D1 the areas corresponding to entry fields, and sets the extracted data as second data D2. The controller 11 then sets the target user's personal information in the second data D2.

Specifically, the sheet S read by the reading portion 13 has an entry field F1 to be filled with a name, an entry field F2 to be filled with an address, an entry field F3 to be filled with a telephone number, an entry field F4 to be filled with a birthday, and an entry field F5 to be filled with a sex designation (a check mark).

Thus the controller 11 locates from the read data five blank field areas which respectively correspond to the entry fields F1 to F5. The controller 11 also recognizes the items of personal information with which to fill those blank field areas. In FIG. 14, the blank field area corresponding to the entry field F1 is indicated by the symbol F10, the blank field area corresponding to the entry field F2 is indicated by the symbol F20, the blank field area corresponding to the entry field F3 is indicated by the symbol F30, the blank field area corresponding to the entry field F4 is indicated by the symbol F40, and the blank field area corresponding to the entry field F5 is indicated by the symbol F50. The same applies to FIG. 15, which will be referred to later.

The controller 11 sets the target user's personal information (name, address, telephone number, birthday, and sex designation) in the second data D2. Specifically, as shown in the upper diagram in FIG. 15, the controller 11 fills the blank field area F10 with the target user's name, fills the blank field area F20 with the target user's address, fills the blank field area F30 with the target user's telephone number, and fills the blank field area F40 with the target user's birthday.

The entry field F5 has check boxes SC1 and CS2. Accordingly, if the target user is a male, the controller 11 puts a check mark at the position corresponding to the check box SC1 in the blank field area F50 (see the upper diagram in FIG. 15). On the other hand, if the target user is a female, the controller 11 puts a check mark at the position corresponding to the check box SC2 in the blank field area F50 (not illustrated).

Here the controller 11 checks, based on the read data of the sheet S read by the reading portion 13, whether or not there is a date field DF as an entry field EF. The sheet S read by the reading portion 13 here further has a date field DF as an entry field EF. Accordingly the controller 11 recognizes that a date field DF is present.

Figure 16:
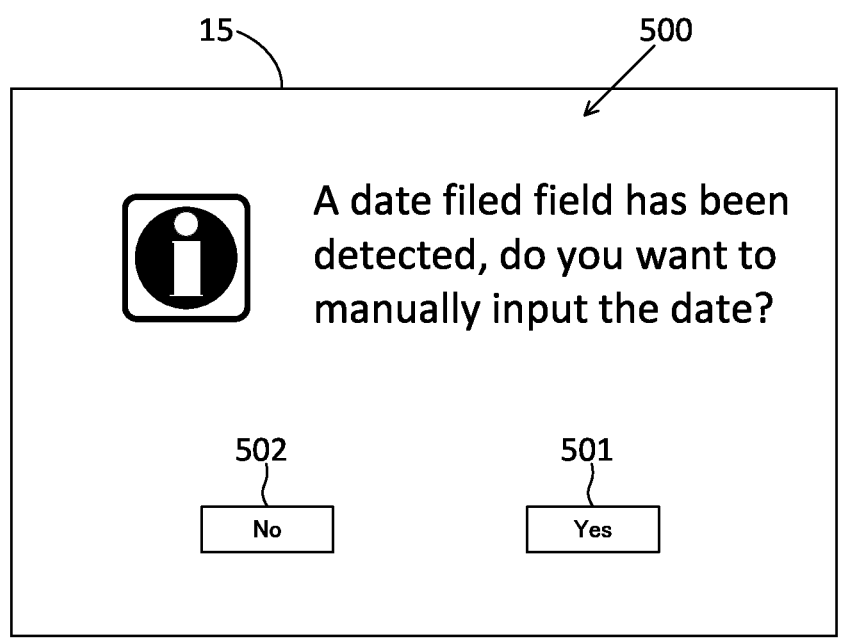
FIG. 16 is a diagram showing a dialog box displayed by the operation panel on the image forming apparatus according to the embodiment.

If the sheet S that the reading portion 13 has read has a date field DF, the controller 11 makes the operation panel 15 accept a choice of whether or not to set the date with which to fill the date field DF. At this time, the operation panel 15 displays a dialog box 500 as shown in FIG. 16 and accepts from the job-requesting user a choice of whether or not to set a date.

The dialog box 500 has a Yes button 501 and a No button 502. On sensing operation on the Yes button 501, the controller 11 recognizes that the operation panel 15 has accepted a choice to set a date. On sensing operation on the Yes button 501, the controller 11 recognizes that the operation panel 15 has accepted a choice not to set a date.

Figure 17:
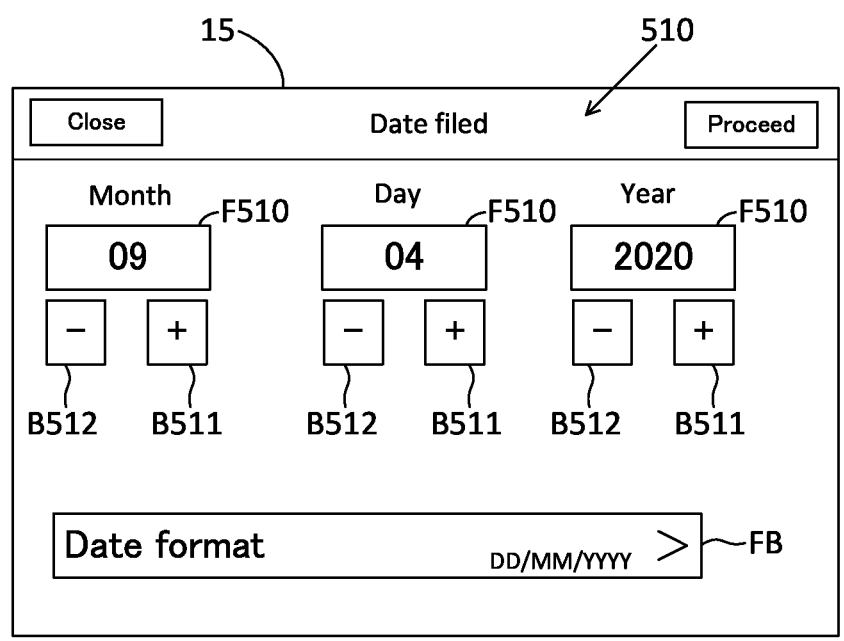
FIG. 17 is a diagram showing a date entry screen displayed by the operation panel on the image forming apparatus according to the embodiment.

On accepting a choice to set a date, the controller 11 makes the operation panel 15 accept the date with which to fill the date field DF. At this time, the operation panel 15 displays a date entry screen 510 as shown in FIG. 17 and accepts from the job-requesting user entry of a date.

The date entry screen 510 has a date entry field F510. The date entry field F510 has input buttons B511 and B512. When the date entry screen 510 starts to be displayed, the date entry field F510 is filled with the current date. Operating the input button B511 moves forward the date in the date entry field F510. Operating the input button B512 moves backward the date in the date entry field F510. The date entry screen 510 allows separate input for year, month, and day. The date entry screen 510 also has a format button FB. Operating the format button FB changes the format of the date.

Figure 15:
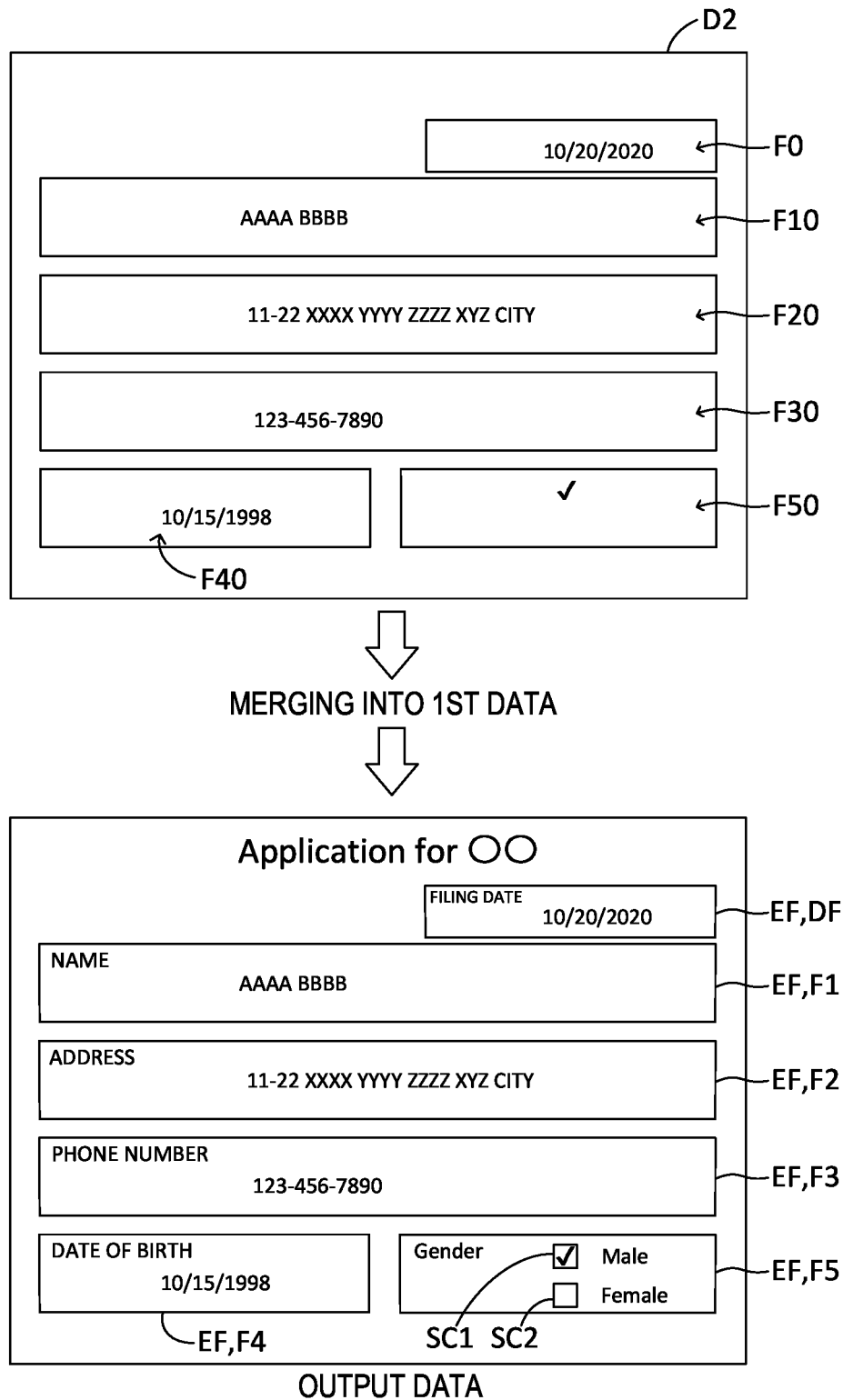
FIG. 15 is a diagram illustrating the output data generation processing performed by the controller in the image forming apparatus according to the embodiment.

If the sheet S has a date field DF, the controller 11 locates in the read data a blank field area that corresponds to the date field DF. In FIGS. 14 and 15, the blank field area corresponding to the date field DF is indicated by the symbol F0.

In response to the operation panel 15 accepting entry of a date, the controller 11 recognizes the entered date. The controller 11 then fill the blank field area F0 with the entered date.

Having filled the blank field areas F10 to F50 with personal information and the blank field area F0 with a date, the controller 11 merges the second data D2 into the first data D1. In this way, output data is generated in which, as shown in the lower diagram in FIG. 15, the entry fields EF (F1 to F5) are filled with the target user's personal information and the date field DF is filled with a data.

In a case where there are a plurality of target users, output data is generated for each target user.

Referring back to FIG. 6, after output data generation processing, the procedure advances to step S6. At step S6, the controller 11 performs processing to output the output data. For example, the controller 11 makes the printing portion 14 perform printing of an image based on the output data on a sheet P. That is, the controller 11 makes the printing portion 14 print the filled sheet FS.

With a configuration according to this embodiment, as described above, the operation panel 15 accepts, from a registered user who has registered personal information, registration of an authorized user whom the registered user permits to access the registered user's own personal information. The controller 11 recognizes the job-requesting user who has requested an automatic filling job, sets as a candidate a registered user who has registered the job-requesting user as an authorized user, makes the operation panel accept designation of a registered users set as a candidate, recognizes a designated registered user as a target user, and generates output data of a filled sheet FS in which entry fields are filled with the target user's personal information.

With this configuration, the job-requesting user can access the personal information of a registered user who has registered the job-requesting user as an authorized user. That is, the job-requesting user can output a filled sheet FS filled with the personal information of a registered user who has registered the job-requesting user as an authorized user. On the other hand, the job-requesting user cannot output a filled sheet FS filled with the personal information of a registered user who has not registered the job-requesting user as an authorized user.

Thus, by registering an authorized user, a registered user can restrain a filled sheet FS filled with his or her own personal information by a user other than the authorized user. It is thus possible to permit only a particular user to output a filled sheet FS filled with the personal information of a given user.

A registered user can receive from the job-requesting user a filled sheet FS already filled with his or her own personal information. Thus a registered user is saved from entering already registered personal information. This gives convenience to the registered user.

In this embodiment, as described above, if the job-requesting user is in a predetermined role (such as a managerial post), the controller 11 sets as candidates all the registered users who belong to the same group as the job-requesting user. With this configuration, the job-requesting user can output a filled sheet FS already filled with the personal information of a registered user even if this registered user has not registered the job-requesting user as an authorized user. This gives enhanced convenience to the job-requesting user.

For example, a director or manager of a department in a cooperation can output a filled sheet FS filled with the personal information of an ordinary employee even if the ordinary employee who belongs to the same department as the director or manager has not registered him or her as an authorized user. This gives enhanced convenience to those in managerial posts such as directors and managers.

In this embodiment, as described above, the controller 11 sets the job-requesting user as a candidate. Thus the job-requesting user can easily obtain a filled sheet FS already filled with his or her own personal information. This gives enhanced convenience to the job-requesting user.

In this embodiment, as described above, the controller 11 makes the reading portion 13 read a personal identification document of a registration-requesting user who has requested scanning registration, and based on the read data of the personal identification document recognizes the personal information on the personal identification document. The controller 11 then registers the recognized personal information as the registration-requesting user's personal information. Thus, by simply scanning his or her personal identification document, the registration-requesting user can register his or her own personal information. This permits easy registration of personal information.

If there is personal information that the registration-requesting user registered earlier, the controller 11 compares the latest information, which is the personal information on the personal identification document that the reading portion 13 has read this time, with the existing information, which is the personal information that the registration-requesting user registered earlier. If the latest and existing information differ, the controller 11 makes the operation panel 15 accept a choice of whether or not to update personal information. If the operation panel 15 receives a choice to update personal information, based on the latest information, the controller 11 updates the registration-requesting user's personal information. It is thus possible to easily update registered personal information. Since a choice of whether or not to update personal information is accepted beforehand, it is possible to prevent unintended updating of personal information.

In this embodiment, as described above, if entry fields include a date field DF, the controller 11 makes the operation panel 15 accept entry of the date with which to fill the date field DF. The controller 11 then generates output data of a filled sheet FS in which the date field DF is filled with the entered date. With this configuration, the date with which the date field DF is filled can be set as desired. This gives enhanced convenience to the job-requesting user.

The embodiment disclosed herein should be understood to be in every aspect illustrative and not restrictive. The scope of the present disclosure is defined not by the description of the embodiment given above but by the appended claims, and encompasses any modifications within the scope and sense equivalent to the appended claims.

What is claimed is:

1. An image processing apparatus, comprising:
   an operation panel which accepts a request for an automatic filling job;
   a reading portion which, when the automatic filling job is executed, reads a sheet with an entry field unfilled; and
   a controller which generates, from read data obtained as a result of the reading portion reading the sheet, output data of a filled sheet with the entry field filled with registered personal information,
   wherein
   the operation panel accepts, from a registered user who has registered the personal information, registration of an authorized user whom the registered user permits to access the registered user's own personal information, and
   when the automatic filling job is executed,
   the controller recognizes a user currently logged in on the image processing apparatus as a job-requesting user who has requested the automatic filling job,
   the controller sets as a candidate the registered user who has registered the job-requesting user as the authorized user,
   the controller makes the operation panel accept designation of one of the registered user set as the candidate and recognizes the designated registered user as a target user,
   the controller generates the output data of the filled sheet with the entry field filled with the target user's personal information,
   the controller recognizes
   a group to which the job-requesting user belongs and a role in which the job-requesting user is, and
   when the job-requesting user is in a role of a manager of the group to which the job-requesting belongs, the controller sets as the candidates all the registered users who belong to the same group as the job-requesting user irrespective of whether the job-requesting user is registered as the authorized user.

2. The image processing apparatus according to claim 1, wherein
   the controller sets the job-requesting user as the candidate.

3. The image processing apparatus according to claim 1, wherein
   the operation panel accepts from a user a request for scanning registration,
   the controller recognizes a registration-requesting user who has requested scanning registration,
   the controller makes the reading portion read a personal identification document of the registration-requesting user and, based on read data resulting from the reading portion reading the personal identification document, recognizes the personal information on the personal identification document, and
   the controller registers the personal information on the personal identification document as the registration-requesting user's personal information.

4. The image processing apparatus according to claim 3, wherein
if there is personal information that the registration-requesting user registered earlier, the controller compares latest information, which is the personal information on the personal identification document that the reading portion has read this time, with existing information, which is the personal information that the registration-requesting user registered earlier, and
if the latest information and the existing information differ, the controller makes the operation panel accept a choice of whether or not to update the personal information, and
if the operation panel accepts a choice to update the personal information, based on the latest information the controller updates the registration-requesting user's personal information.

5. The image processing apparatus according to claim 1, wherein
based on the read data of the sheet, the controller checks whether or not the entry field includes a date field, and
if there is the date field, the controller makes the operation panel accept entry of a date with which to fill the date field and generates the output data of the filled sheet with the date field filled with the entered date.

6. An image processing system, comprising:
the image processing apparatus according to claim 1;
a personal information server which stores the personal information; and
an authorization management server which stores authorization information in which the authorized user is associated with the registered user who has registered the authorized user,
wherein
the controller accesses the authorization management server to recognize the registered user who has registered the job-requesting user as the authorized user, and
the controller accesses the personal information server to recognize the target user's personal information.

* * * * *